(12) United States Patent
Matsubara

(10) Patent No.: US 9,319,481 B2
(45) Date of Patent: Apr. 19, 2016

(54) DISTRIBUTION SERVER

(71) Applicant: Konica Minolta, Inc., Chiyoda-ku (JP)

(72) Inventor: Shigenori Matsubara, Minoo (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 304 days.

(21) Appl. No.: 13/900,025

(22) Filed: May 22, 2013

(65) Prior Publication Data

US 2013/0318212 A1 Nov. 28, 2013

(30) Foreign Application Priority Data

May 24, 2012 (JP) .................................. 2012-118586

(51) Int. Cl.
*G06F 15/16* (2006.01)
*H04L 29/08* (2006.01)
*G06Q 30/06* (2012.01)

(52) U.S. Cl.
CPC ............ *H04L 67/32* (2013.01); *G06Q 30/0601* (2013.01); *H04L 67/303* (2013.01)

(58) Field of Classification Search
CPC ....................................................... H04L 67/32
USPC .................................................. 709/217, 219
See application file for complete search history.

(56) References Cited

U.S. PATENT DOCUMENTS

| | | | |
|---|---|---|---|
| 6,560,645 B1 * | 5/2003 | Igawa et al. | 709/223 |
| 7,865,567 B1 * | 1/2011 | Hendricks et al. | 709/214 |
| 2008/0151280 A1 | 6/2008 | Kamijo et al. | |

FOREIGN PATENT DOCUMENTS

| | | | |
|---|---|---|---|
| JP | 2003150597 A | | 5/2003 |
| JP | 2004-110413 A | | 4/2004 |
| JP | 2004-192369 A | | 7/2004 |
| JP | 2005-268842 A | | 9/2005 |
| JP | 2005-284572 A | | 10/2005 |
| JP | 2009-188776 A | | 8/2009 |
| WO | 2008/075748 A1 | | 6/2008 |
| WO | 2012/029106 A1 | | 3/2012 |

OTHER PUBLICATIONS

Office Action (Notice of Grounds of Rejection) issued on Sep. 24, 2014, by the Japanese Patent Office in corresponding Japanese Patent Application No. 2012-118586 and an English translation of the Office Action. (5 pages).

* cited by examiner

*Primary Examiner* — Adnan Mirza
(74) *Attorney, Agent, or Firm* — Buchanan Ingersoll & Rooney PC

(57) ABSTRACT

A distribution server includes a receiving section configured to receive an acquisition request for an electronic book data, a purchase determining section configured to determine whether or not a user has purchased a book, a terminal type determining section configured to determine a type of a terminal possessed by the user, and a transmitting section configured to distribute the electronic book data in relation to the book to the terminal. The transmitting section includes an additional information extracting section configured to extract the additional information contained in the electronic book data on the basis of a determination result of the terminal type determining section, and a transmission switch determining section configured to distribute electronic book data containing the body text information and the additional information or electronic book data containing only the additional information on the basis of the determination result of the terminal type determining section.

15 Claims, 18 Drawing Sheets

LINK INFORMATION OF "ISBN 1111
THE DIARY OF ANIMALS" IS ACQUIRED:

p115 CRYING SOUND OF CAT
p115 RUNNING STYLE (ANIMATION)
p116 REFERENCE INFORMATION
     (EXTERNAL LINK)
p117 CRYING SOUND OF MEERKAT
p117 JUMP (ANIMATION)
p117 RUNNING STYLE (ANIMATION)

ISBN1111
[COMPLETE DATA]

| DATE | PURCHASED BOOK | CREDIT CARD | ID | DOWNLOAD PERMISSION |
|---|---|---|---|---|
| 2000/1/1 | ISBN9999 | 1234-5678 | me@gmail.com | Yes |
| 2000/1/1 | ISBN8888 | 1234-5678 | me@gmail.com | Yes |
| 2012/1/1 | ISBN1111 | 1234-5678 | me@gmail.com | Yes |

EXTRACT ELECTRONIC BOOK DATA HAVING IDENTICAL CREDIT CARD DATA OR IDENTICAL USER ID AND "YES" DOWNLOAD PERMISSION (B) DATABASE OF YEAR 2000

| DATE | PURCHASED BOOK | CREDIT CARD | ID | DOWNLOAD PERMISSION |
|---|---|---|---|---|
| 2000/1/1 | ISBN9999 | 1234-5678 | — | — |
| 2000/1/1 | ISBN8888 | 1234-5678 | — | — |

SINCE DISTRIBUTION SERVICE OF ELECTRONIC BOOK DATA WAS NOT PROVIDED AT THE TIME (2000/1/1) WHEN ELECTRONIC BOOK WAS PURCHASED, INFORMATION RELATED TO DOWNLOAD PERMISSION IS ABSENT.

DATABASE OF YEAR 2012

| DATE | PURCHASED BOOK | CREDIT CARD | ID | DOWNLOAD PERMISSION |
|---|---|---|---|---|
| 2000/1/1 | ISBN9999 | 1234-5678 | me@gmail.com | Yes |
| 2000/1/1 | ISBN8888 | 1234-5678 | me@gmail.com | Yes |
| 2012/1/1 | ISBN1111 | 1234-5678 | me@gmail.com | Yes |

DOWNLOAD PERMISSION IS GRANTED RETROACTIVELY WITH RESPECT TO ELECTRONIC BOOKS PURCHASED WITH THE SAME CREDIT CARD.

FIG.18

```
LINK INFORMATION OF "ISBN 1111
THE DIARY OF ANIMALS" IS ACQUIRED:

p115    CRYING SOUND OF CAT         }— 512
p115    RUNNING STYLE (ANIMATION)
p116    REFERENCE INFORMATION
        (EXTERNAL LINK)
p117    CRYING SOUND OF MEERKAT
p117    JUMP (ANIMATION)
p117    RUNNING STYLE (ANIMATION)
p118    DELETE LINES 6 AND 7        }— 542
```

DISTRIBUTION SERVER

This application is based on Japanese Patent Application No. 2012-118586 filed with the Japan Patent Office on May 24, 2012, the entire content of which is hereby incorporated by reference.

BACKGROUND OF THE INVENTION

1. Field of the Invention

The present invention relates to a distribution server capable of distributing electronic book data via a network.

2. Description of the Related Art

In recent years, it is known to computerize character information and/or picture information of a book into electronic book data. The electronic book data is stored preliminarily in a storing section or the like, and the electronic book data stored in the storing section is distributed from a distribution server to a communication terminal of a user. Therefore, such a system has been used to allow the user to obtain the content of a book as the electronic book data without purchasing the book and read the content thereof on the communication terminal (for example, see Japanese Laid-Open Patent Publication No. 2005-284572).

Meanwhile, a purchaser who has purchased a book from a bookstore may desire to receive the electronic book data having the same content as the purchased book and read it on the communication terminal. In this case, in order to get the distribution service of the electronic book data, in addition to the fee for the already purchased book, the charge for the distribution service of the electronic book data must be paid again. Thereby, the service becomes unfavorable to the user.

In this regard, Japanese Laid-Open Patent Publication No. 2004-192369 discloses an electronic book information distribution system which allows a user who has purchased a book from a bookstore to get the distribution service of the electronic book data having the same content as the purchased book.

The electronic book data may be distributed not only in the form of body text information containing characters of the book content but also in the form of additional data (additional information) such as a hyperlink or the like linked to a part of the body text information to provide such additional functions that the user may play audios and/or animations, or access another website by clicking the hyperlink.

However, in a case where a communication terminal has a small display screen, if the electronic book data containing the entire information is distributed, it may make the browsing difficult due to a large amount of information.

SUMMARY OF THE INVENTION

To solve the above problems, the present invention provides a distribution server capable of distributing electronic book data appropriately in accordance with a type of a terminal possessed by a user.

According to one aspect, the present invention provides a distribution server which is stored with electronic book data which includes, in relation to a book, body text information written in the book and additional information associated with at least a part of the body text information. The distribution server includes: a receiving section configured to receive an acquisition request transmitted from a terminal possessed by a user for the electronic book data in relation to the book; a purchase determining section configured to determine whether or not the user has purchased the book as the acquisition request for the electronic book data in relation to the book has been received by the receiving section; a terminal type determining section configured to determine a type of the terminal possessed by the user who has transmitted the acquisition request for the electronic book data as the purchase determining section has determined that the user has purchased the book; and a transmitting section configured to distribute the electronic book data in relation to the book to the terminal possessed by the user, the transmitting section including an additional information extracting section configured to extract the additional information contained in the electronic book data on the basis of a determination result of the terminal type determining section, and a transmission switch determining section configured to distribute the electronic book data containing the body text information and the additional information or the electronic book data containing only the additional information on the basis of the determination result of the terminal type determining section.

Preferably, the distribution server further includes a storing section configured to store purchase record data of book purchased by the user, wherein the purchase determining section is configured to determine whether or not the user has purchased the book on the basis of the purchase record data.

Preferably, the distribution server is stored with a plurality of electronic book data in respective relation to a plurality of books, the plurality of books are respectively assigned with unique identification information, and the acquisition request for the electronic book data in relation to the book contains the identification information for identifying the book.

Particularly, the data of the identification information is read from a reading section disposed in the terminal possessed by the user or input from an input section disposed in the terminal.

Preferably, the transmitting section further includes an inquiring section configured to transmit, along with the electronic book data including only the body text information written in the book, an inquiry about whether or not a distribution request for the electronic book data including the body text information and the additional information is present.

Preferably, the distribution server is stored with a plurality of electronic book data in respective relation to a plurality of books, the distribution server further includes a storing section configured to store purchase record data of books purchased by the user, and the transmitting section further includes a list transmitting section configured to transmit, along with the electronic book data, a list of electronic book data in relation to other book which can be distributed on the basis of the purchase record data stored in the storing section.

Particularly, the list is configured to allow the acquisition request for the electronic book data in relation to the other book to be transmitted selectively from the terminal, the distribution server further includes a list selection receiving section configured to receive the acquisition request for the electronic book data in relation to the other book selected from the list, and the transmitting section further includes a retransmitting section configured to distribute the selected electronic book data including the body text information written in the other book and the additional information as the list selection receiving section has received the acquisition request for the electronic book data in relation to the other book selected from the list.

Particularly, the list is configured to allow the transmission of the acquisition request for the electronic book data including only the additional information in relation to the other book or for the electronic book data including the body text information written in the other book and the additional information to be transmitted selectively from the terminal, and the distribution server includes: a list selection receiving section configured to receive the acquisition request for the electronic book data in relation to the other book selected from the list; and a retransmitting section configured to distribute the selected electronic book data including at least one of the body text information written in the other book and the additional information in accordance with a selection of the other book from the list as the list selection receiving section has received the acquisition request for the electronic book data in relation to the other book selected from the list.

Preferably, the additional information is information other than the body text information written in the book.

Particularly, the distribution server further includes an original book storing section configured to store original book data including original text information written in the book, wherein the additional information extracting section is configured to compare the electronic book data with the original book data stored in the original book storing section to extract the additional information.

Particularly, the distribution server is stored with a plurality of electronic book data in respective relation to version numbers of the book, and the transmitting section includes: a version number acquiring section configured to acquire information about a version number of the book purchased by the user; and an editing section configured to compare the electronic book data having the version number acquired by the version number acquiring section with the electronic book data having the latest version number and edit the additional information on the basis of the comparison result.

According to one aspect, the present invention provides a method for controlling a distribution server stored with electronic book data which includes, in relation to a book, body text information written in the book and additional information associated with at least a part of the body text information. The method includes: receiving an acquisition request transmitted from a terminal possessed by a user for the electronic book data in relation to the book; determining whether or not the user has purchased the book as the acquisition request for the electronic book data in relation to the book has been received; determining a type of the terminal possessed by the user who has transmitted the acquisition request for the electronic book data as it is determined that the user has purchased the book; and distributing the electronic book data in relation to the book to the terminal possessed by the user, distributing the electronic book data to the terminal including: extracting the additional information contained in the electronic book data on the basis of a determination result of the type of the terminal; and distributing the electronic book data containing the body text information and the additional information or the electronic book data containing only the additional information on the basis of the determination result of the type of the terminal.

According to one aspect, the present invention provides a recording medium recorded with a program for controlling a computer of a distribution server stored with electronic book data which includes, in relation to a book, body text information written in the book and additional information associated with at least a part of the body text information. The program is configured to cause the computer to execute a process including: receiving an acquisition request transmitted from a terminal possessed by a user for the electronic book data in relation to the book; determining whether or not the user has purchased the book as the acquisition request for the electronic book data in relation to the book has been received; determining a type of the terminal possessed by the user who has transmitted the acquisition request for the electronic book data as it is determined that the user has purchased the book; and distributing the electronic book data in relation to the book to the terminal possessed by the user, distributing the electronic book data to the terminal including: extracting the additional information contained in the electronic book data on the basis of a determination result of the type of the terminal; and distributing the electronic book data containing the body text information and the additional information or the electronic book data containing only the additional information on the basis of the determination result of the type of the terminal.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a view illustrating a case where the electronic book data is displayed on mobile phone 200# according to Embodiment 2 of the present invention;

FIG. 14 is a view illustrating an approach of generating list information in a list generating section 46 according to Embodiment 3 of the present invention;

FIG. 18 is a view illustrating a case where only edited additional information in the electronic book data is displayed on mobile phone 200# according to Embodiment 4 of the present invention.

DESCRIPTION OF THE PREFERRED EMBODIMENTS

Figure 1:
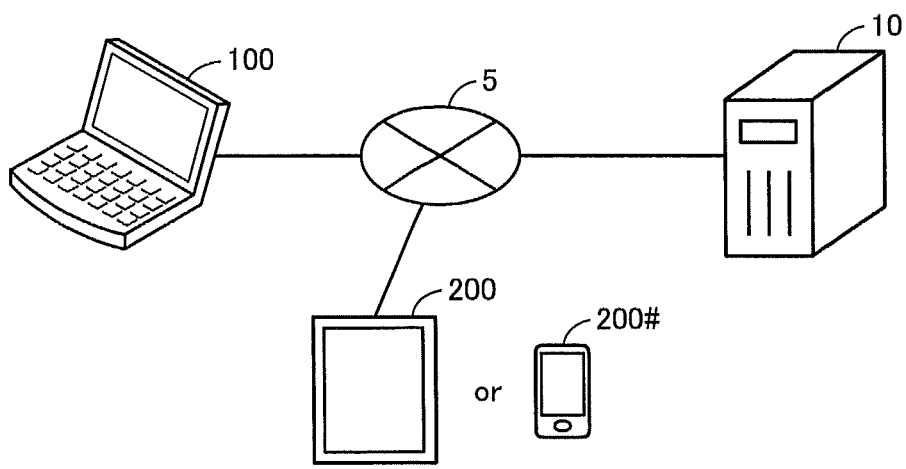
FIG. 1 is a view illustrating a configuration of an electronic book distribution system 1 according to Embodiment 1 of the present invention.

Hereinafter, embodiments of the present invention will be described with reference to the drawings. In the description hereinafter, the same component and the same constituent element will be assigned with the same reference numeral, and thereby the names and functions thereof are assumed to be the same.

Embodiment 1

FIG. 1 is a view illustrating a configuration of an electronic book distribution system 1 according to Embodiment 1.

With reference to FIG. 1, electronic book distribution system 1 according to Embodiment 1 includes a distribution server 10 and a terminal or the like capable of communicating with distribution server 10 via a network 5.

In the present embodiment, distribution server 10 is set up with a book selling site capable of being accessed by a user via a possessing terminal or the like to purchase print books. Specifically, distribution server 10 is set up to be capable of accepting a purchase request for a print book via the book selling site. When the purchase request for the print book from a user is accepted, a manager or the like of distribution server 10 delivers the print book to the user according to a predetermined procedure. Thereby, the user who has made the purchase request for the print book can receive the delivered print book. Moreover, distribution server 10 according to the present embodiment is configured to be capable of not only selling the print book via the book selling site but also distributing electronic book data in relation to the book. Specifically, character information and/or picture information of a book is computerized into electronic book data to be stored preliminarily in a storing section or the like, and the electronic book data stored in the storing section is configured to be able to be distributed to the user's terminal.

It should be noted that in the present embodiment, the description is made on the case where the sell administration of print books and the distribution function of electronic book data are performed in a single distribution server 10; however, it is not limited thereto in particular, and it is obviously possible that respective processes may be performed in different servers.

In the present embodiment, an information processing terminal (PC) 100, a portable tablet terminal 200 and a mobile phone 200# are illustrated as an example of a terminal. In the present embodiment, tablet terminal 200 is configured to have a display screen in a greater size than mobile phone 200#.

The electronic book distribution system in the present embodiment is described as having a configuration including one distribution server 10, one information processing terminal 100, one tablet terminal 200 or mobile phone 200#; however, the number is not limited to one in particular, it is acceptable that the configuration may include multiple components, and it is also possible that information processing terminal 100 may not be included. LAN or WAN (Wide Area Network) may be used as a connection to the network. The connection to the network may be wired or wireless.

Figure 2:
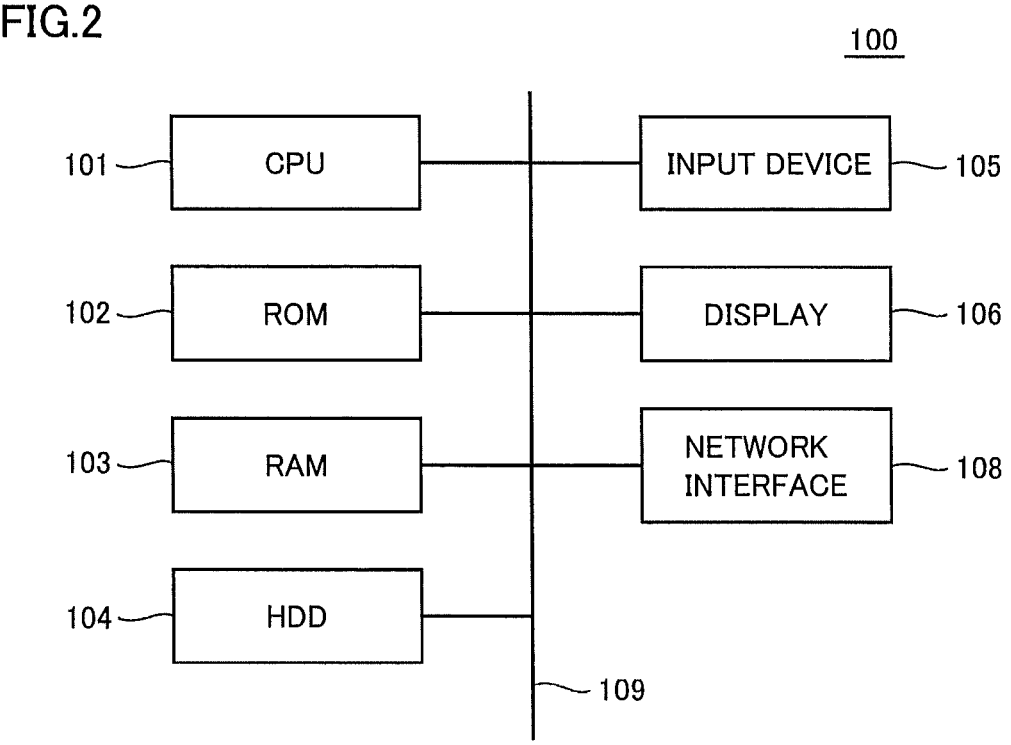
FIG. 2 is a view illustrating a configuration of an information processing terminal (PC) 100 according to Embodiment 1 of the present invention.

FIG. 2 is a view illustrating a configuration of information processing terminal (PC) 100 according to Embodiment 1.

With reference to FIG. 2, PC 100 according to Embodiment 1 includes a CPU (Central Processing Unit) 101 which is a controller (controlling section) configured to execute various programs including an operating system (OS), a RAM 103 configured to temporarily store necessary data for executing a program in CPU 101, a hard disk drive (HDD) 104 which is a nonvolatile storing device (storing section) configured to store a program to be executed in CPU 101, various data and files, and the like, a ROM 102 preliminarily stored with the program to be executed in CPU 101, an input device (input section) 105 including a keyboard, a mouse and the like, a display 106 which is a display device (display section) configured to display a screen, and a network interface 108 which is a transmitting/receiving device (transmitting/receiving section) configured to perform data exchange with the external via network 5.

The components mentioned above exchange data between each other via an internal bus 109. In the present embodiment, display 106 is described to be integral with the main body of the information processing terminal (PC); however, it is not limited thereto in particular, display 106 may be a separate part.

In the present embodiment, as an example, the description will be made on a case where a user accesses the accessible book selling site of distribution server 10 from PC 100 via network 5 to purchase a print book. Herein, the user inputs necessary information for purchasing the book through input device 105 of PC 100. In the present embodiment, as an example, a user ID for identifying the user, necessary credit card information for charging for the purchase and the like are input. As an example, a mail address or the like of the user may be input as the user ID. In addition, a delivery address or the like required for delivering the book may also be input.

Figure 3:
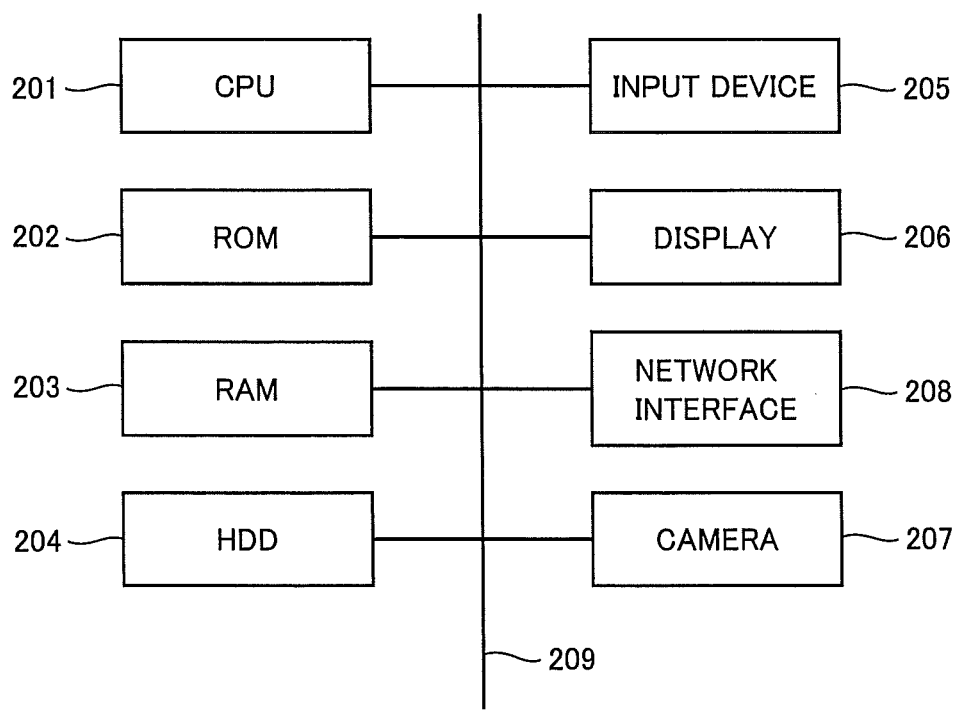
FIG. 3 is a view illustrating a configuration of a tablet terminal 200 or a mobile phone 200# according to Embodiment 1 of the present invention.

FIG. 3 is a view illustrating a configuration of tablet terminal 200 or mobile phone 200# according to embodiment 1.

With reference to FIG. 3, tablet terminal 200 according to Embodiment 1 includes a CPU (Central Processing Unit) 201 which is a controller (controlling section) configured to execute various programs including an operating system (OS), a RAM 203 configured to temporarily store necessary data for executing a program in CPU 201, a hard disk drive (HDD) 204 which is a nonvolatile storing device (storing section) configured to store a program to be executed in CPU 201, various data, files and the like, a ROM 202 preliminarily stored with the program to be executed in CPU 201, an input device (input section) 205 including a keyboard, a mouse and the like, a display 206 which is a display device (display section) configured to display a screen, a network interface 208 which is a transmitting/receiving device (transmitting/receiving section) configured to perform data exchange with the external via network 5, and a camera 207 which is an imaging section. To be described hereinafter in the present embodiment, as an example, camera 207 is used in reading a QR code (registered trademark) which is one of 2D matrix codes. The components mentioned above exchange data between each other via an internal bus 209.

Tablet terminal 200 and mobile phone 200# are identical in basic configuration but different in that tablet terminal 200 does not have a verbal communication function. In the present embodiment, display 206 of tablet terminal 200 is configured to be greater in size than mobile phone 200#.

In the present embodiment, tablet terminal 200 or mobile phone 200# is configured to receive the distribution of electronic book data in relation to a print book from distribution server 10 after the user has purchased the print book.

In the above, the print book is described to be purchased by using PC 100 to access distribution server 10; however, it is not limited to PC 100 in particular, and the print book may be purchased according to a procedure similar to the above one by using tablet terminal 200 or mobile phone 200#.

Figure 4:
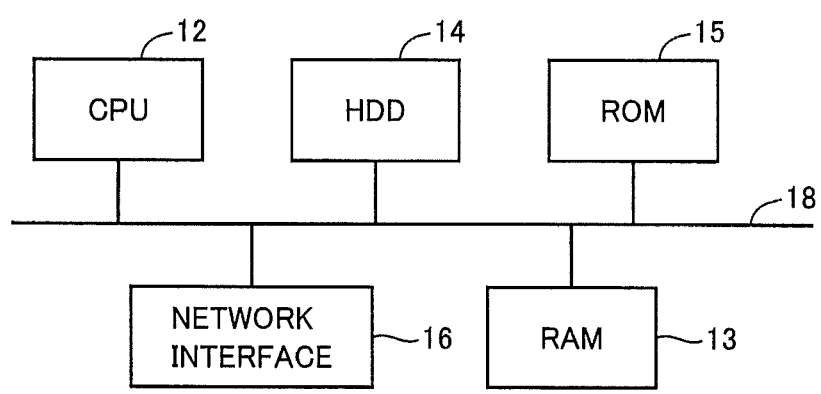
FIG. 4 is a view illustrating a configuration of a distribution server 10 according to Embodiment 1 of the present invention.

FIG. 4 is a view illustrating a configuration of distribution server 10 according to Embodiment 1.

With reference to FIG. 4, distribution server 10 according to Embodiment 1 includes a CPU (Central Processing Unit) 12 which is a controller (controlling section) configured to execute various programs including an operating system (OS), a RAM 13 configured to temporarily store necessary data for executing a program in CPU 12, a hard disk drive (HDD) 14 which is a nonvolatile storing device (storing section) configured to store a program to be executed in CPU 12, various data, files and the like, a ROM 15 preliminarily stored with the program to be executed in CPU 12, and a network interface 16 which is a transmitting/receiving device (transmitting/receiving section) configured to perform data exchange with the external via network 5. The components mentioned above exchange data between each other via an internal bus 18.

In the present embodiment, HDD 14 of distribution server 10 is configured to preliminarily store electronic book data computerized from character information and/or picture information of a book. The electronic book data stored in HDD 14 is distributed to the user's terminal via network interface 16. Moreover, in the present embodiment, distribution server 10 is configured to store in HDD 14 data required to display the screen of the book selling site capable of selling print books on the terminal or the like possessed by the user, and to store in HDD 14 or ROM 15 programs or the like required to execute, in cooperation with CPU 12, necessary processes for the purchase or the like of print books.

Hereinafter, the description will be made on functional blocks to be implemented in distribution server 10 in cooperation with CPU 12 or the like on the basis of programs, data and the like stored in HDD 14 or the like of distribution server 10.

Figure 5:
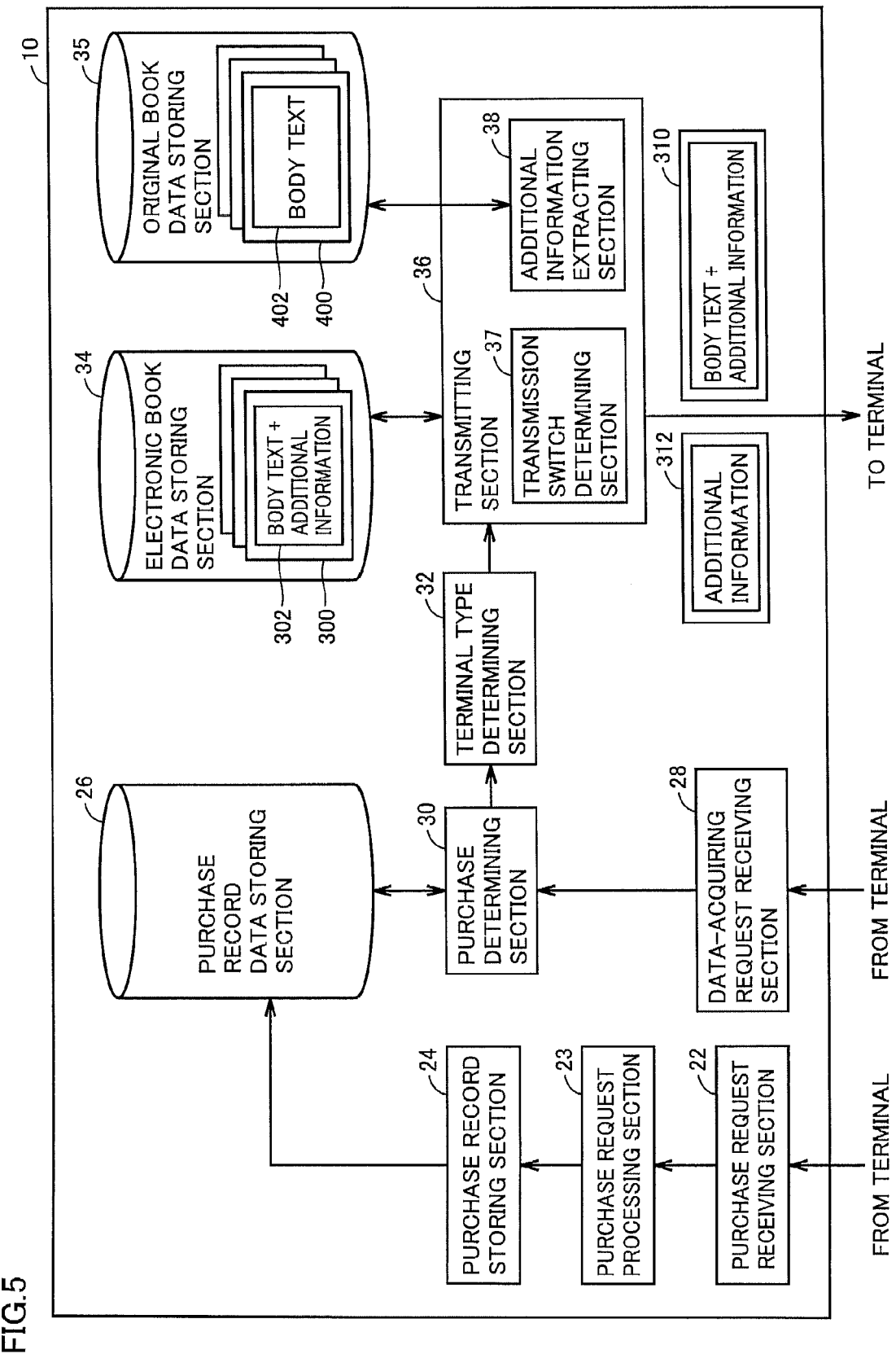
FIG. 5 is a view illustrating functional blocks of distribution server 10 according to Embodiment 1 of the present invention.

FIG. 5 is a view illustrating functional blocks of distribution server 10 according to Embodiment 1.

With reference to FIG. 5, various functional blocks to be implemented by CPU 12 on the basis of programs, data and the like stored in HDD 14 are illustrated herein.

Specifically, distribution server 10 includes a purchase request receiving section 22 configured to receive a purchase request from the terminal possessed by the user, a purchase request processing section 23 configured to process the purchase request received by purchase request receiving section 22, a purchase record storing section 24, and a purchase record data storing section 26.

Purchase record storing section 24 stores a purchase record in purchase record data storing section 26 on the basis of a processing result (purchase process) from purchase request processing section 23.

Moreover, distribution server 10 further includes a data-acquiring request receiving section 28 configured to receive a request of acquiring (downloading) the electronic book data sent from the terminal possessed by the user, a purchase determining section 30, a terminal type determining section 32, a transmitting section 36 configured to transmit the electronic book data to the terminal, an electronic book data storing section 34 configured to store at least one piece of electronic book data 300 in relation to a book, and an original book data storing section 35 configured to store at least one piece of original book data 400 in relation to the book. As a print book is published, the electronic book data and the original book data in relation to the book are associated with a book identification number assigned when the book is published and stored in electronic book data storing section 34 and original book data storing section 35, respectively, by the manager or the like. It is also acceptable to store the electronic book data and the original book data in relation to a previously published book in electronic book data storing section 34 and original book data storing section 35, respectively.

Original book data 400 contains only body text information 402 which is the information of original characters and the like of a book.

Electronic book data 300 contains not only the body text information of characters and the like of a book but also "body text+additional" information 302 including additional data (additional information) such as a hyperlink or the like linked to at least a part of the body text information. According to the additional information, for example, by using the hyperlink, it is possible for a user to play audios and/or animations, or access another website by clicking the link.

Purchase determining section 30 determines, in accordance with the request of acquiring the electronic book data received by data-acquiring request receiving section 28, whether or not the user sending the acquiring request has purchased the book on the basis of the purchase record stored in purchase record data storing section 26.

When the user sending the acquiring request is determined to have a purchase record of purchasing the book by purchase determining section 30, terminal type determining section 32 determines the type of the accessing terminal.

Transmitting section 36 includes a transmission switch determining section 37 and an additional information extracting section 38.

Additional information extracting section 38 compares electronic book data 300 stored in electronic book data storing section 34 and original book data 400 stored in original book data storing section 35 where necessary, and extracts the additional information on the basis of the comparison result.

Transmission switch determining section 37 switches, on the basis of the terminal type determined by terminal type determining section 32, the content of the electronic book data for transmitting. Specifically, the additional information only which is extracted by additional information extracting section 38 is transmitted to the terminal as electronic book data 312. Alternatively, the entire data of "body text+additional" information is transmitted as electronic book data 310.

Figure 6:
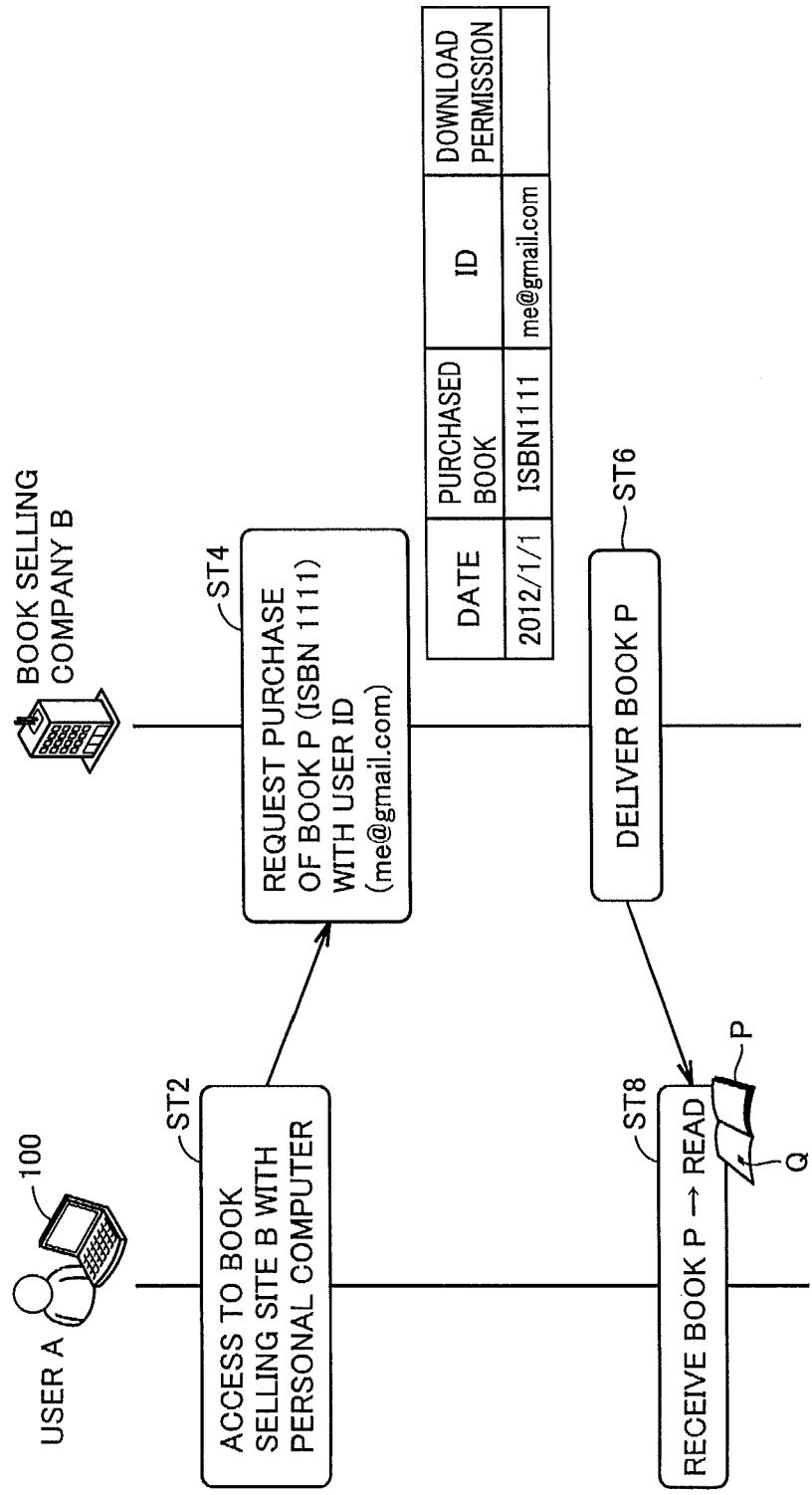
FIG. 6 is a view illustrating a process flow of purchasing a book according to Embodiment 1 of the present invention.

FIG. 6 is a view illustrating a process flow of purchasing a book according to Embodiment 1.

With reference to FIG. 6, a process flow by which a user A purchases a book P from a book selling company B will be described hereinafter.

In the present example, book selling company B owns distribution server 10, and it is possible for user A to purchase print book P by accessing the book selling site of distribution server 10 through the user's information processing terminal 100.

Specifically, firstly, user A accesses the book selling site of distribution server 10 via network 5 from the user's information processing terminal 100 (sequence ST 2). In order to make available the purchase process for purchasing a book from the book selling site of distribution server 10, user A is assumed to have a user ID preliminarily registered in distribution server 10 or the like. For example, in the registration, the user ID, credit card information for charging, user address for delivering a book and the like may be registered.

Next, user A requests purchasing book P (ISBN 1111) being sold at the book selling site of distribution server 10 with the user ID (me@gmail.com) (sequence ST4). Specifically, purchase request receiving section 22 of distribution server 10 accepts the purchase request for book P. Here, as an example, book P is assigned with a book identification number of ISBN 1111. ISBN (International Standard Book Number) is a number used universally to identify a book.

Distribution server 10 processes the purchase request for book P (ISBN 1111) from user A for delivering book P (sequence ST6). Specifically, purchase request processing section 23 performs necessary processing such as charging or the like in accordance with the received purchase request for book P (ISBN 1111). Moreover, purchase request processing section 23 notifies the manager or the like of the purchase request. Thereby, the manager or the like delivers book P (ISBN 1111) through a delivery company. In addition, if the purchase request for book P has been normally processed in purchase request processing section 23, purchase record storing section 24 stores the purchase record in purchase record data storing section 26.

In the present embodiment, a purchase date when user A purchased the book, the book identification number (ISBN 1111) and the user TD are associated and stored with each other as the purchase record in a database in purchase record storing section 24. In other words, data related to the purchase record of each user is stored in purchase record storing section 24. Moreover, a flag representing whether or not the distribution of the electronic book data is possible (whether or not the download is permitted) is also associated and stored in the purchase record. To be described hereinafter, when the distribution of the electronic book data is requested, the purchase record is verified so as to determine whether or not the book has been purchased. If it is determined that the book has been purchased, the flag of the download permission in the purchase record is changed to "YES".

Thereafter, user A receives book P for reading (sequence ST8). In the present embodiment, a QR code Q embedded with predetermined information is printed at a location of print book P. The predetermined information embedded in QR code Q can be acquired by, for example, analyzing an image of QR code Q imaged by using a camera disposed in the terminal possessed by the user. A program for analyzing QR code Q may be preliminarily stored in the terminal or the like.

Figure 7:
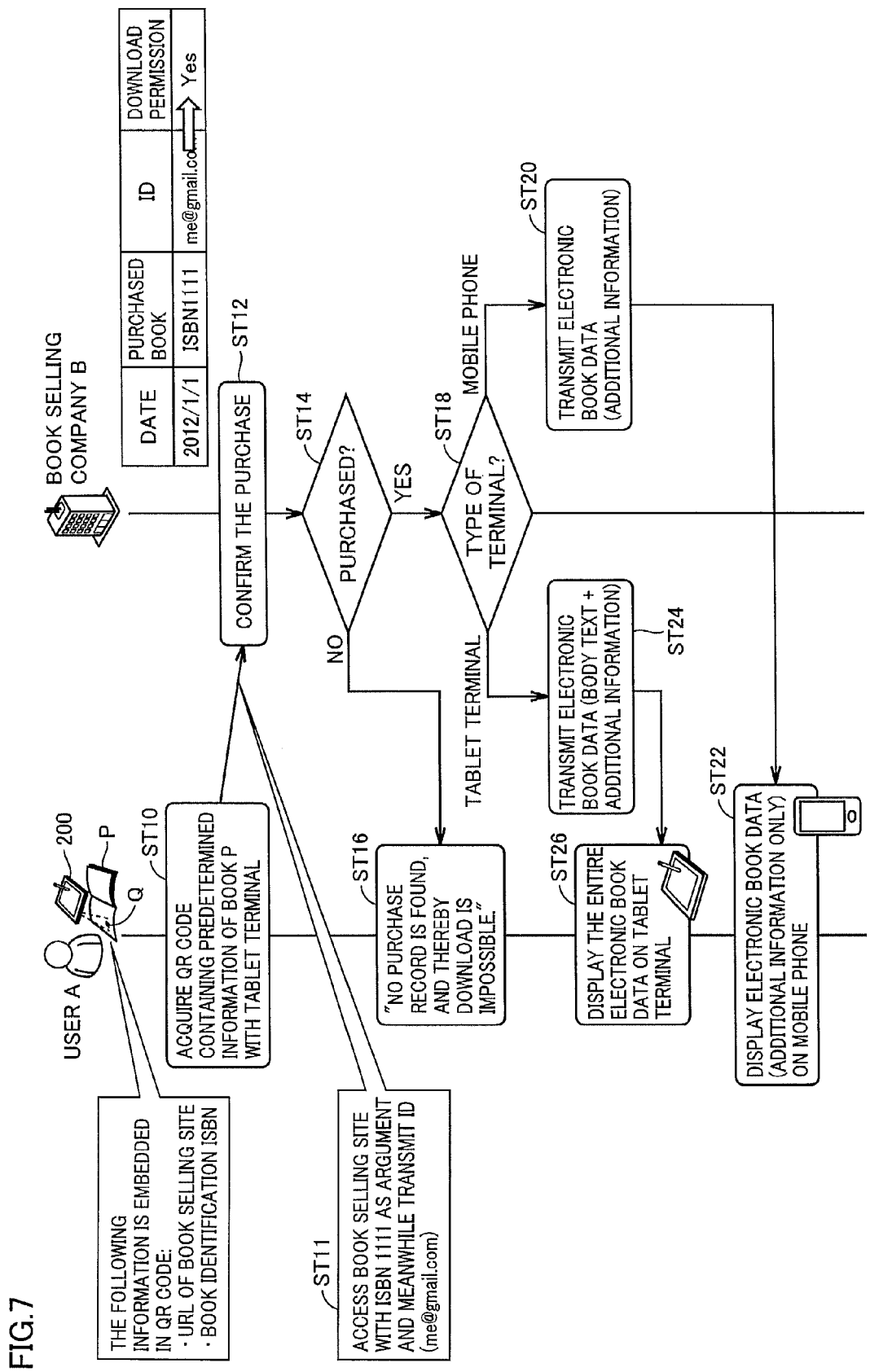
FIG. 7 is a view illustrating a process flow of distributing electronic book data in relation to a book according to Embodiment 1 of the present invention.

FIG. 7 is a view illustrating a process flow of distributing electronic book data in relation to a book according to Embodiment 1.

With reference to FIG. 7, firstly, user A acquires the predetermined information in QR code Q of the received book P with tablet terminal 200 (sequence ST 10). It is configured that QR code Q is embedded with a URL to be used to access the book selling site of distribution server 10 via network 5 and the book identification number (ISBN 1111) for identifying book P as the predetermined information. Through analyzing an image of QR code Q imaged by using camera 207 of tablet terminal 200, the URL used to access the book selling site of distribution server 10 via network 5 and the book identification number can be acquired. In the present embodiment, it is described that the URL to the book selling site and the book identification number are acquired through imaging QR code Q by using camera 207 but not limited thereto in particular; for example, it is acceptable to acquire the URL and the book identification number or the like through the same information printed on book P.

Thereafter, tablet terminal 200 is used to access (transmit the data acquiring request to) the book selling site of distribution server 10 according to the acquired URL by using the book identification number (ISBN 1111) as an argument (sequence ST11). Meanwhile, the user ID (me@gmail.com) of user A possessing tablet terminal 200 is also transmitted. In this way, even without the input or the like of the book identification number and the URL through input device 205, it is possible to access the book selling site of distribution server 10 in a simple manner to specify the electronic book data for downloading.

After receiving the data acquiring request with the book identification number (ISBN 1111) serving as the argument together with the user ID, distribution server 10 verifies whether or not the user has purchased the book in relation to the book identification number (sequence ST12), in other words, verifies the purchase record.

Thereafter, in distribution server 10, whether or not the book has been purchased is determined in accordance with the purchase record (sequence ST14).

If it is determined that the book has not been purchased, a piece of message indicating that the book has not been purchased is displayed on display 206 of tablet terminal 200 possessed by user A (sequence ST16). In the present embodiment, as an example, such a piece of message saying "no purchase record is found, and thereby download is impossible." is displayed.

On the other hand, if it is determined that the book has been purchased, the type of the terminal being used to access distribution server 10 is determined (sequence ST 18). In addition, if it is determined that the book has been purchased, the flag of the download permission in the purchase record is changed to "YES". Thereby, the distribution of the electronic book data to the terminal is permitted.

Subsequently, if it is determined that the terminal being used to access distribution server 10 is a mobile phone, the electronic book data containing only the additional information in relation to the requested book identification number is transmitted to the mobile phone (sequence ST20).

Thereby, the electronic book data containing only the additional information distributed from distribution server 10 is displayed on the mobile phone (sequence ST22).

On the other hand, if it is determined that the terminal being used to access distribution server 10 is a tablet terminal, the electronic book data containing the "body text+additional" information in relation to the requested book identification number is transmitted to the mobile phone (sequence ST24).

Thereby, the electronic book data containing the entire data of the "body text+additional" information distributed from distribution server 10 is displayed on the tablet terminal (sequence ST26).

In other words, the content of the electronic book data is switched in accordance with the type of the terminal being used to access distribution server 10. In a case of a tablet terminal, the entire data is distributed; in a case of a mobile phone, only the additional information is distributed.

Figure 8:
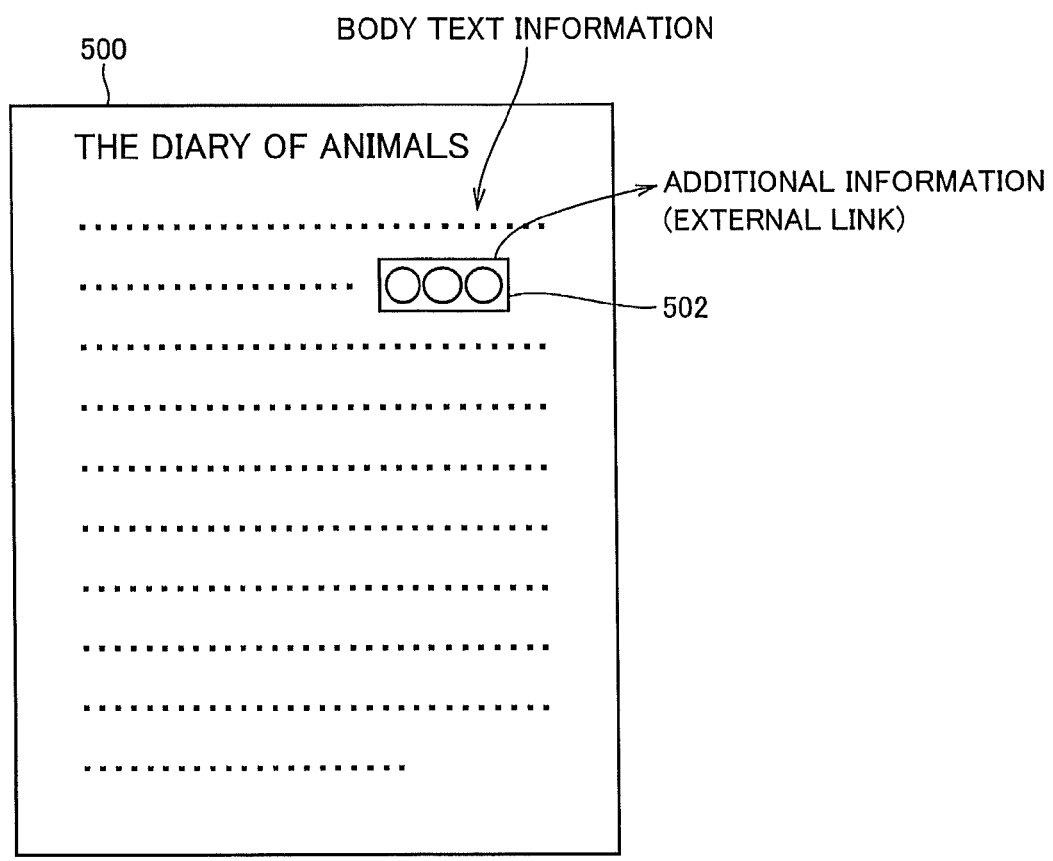
FIG. 8 is a view illustrating a case where the entire electronic book data is displayed on tablet terminal 200 according to Embodiment 1 of the present invention.

FIG. 8 is a view illustrating a case where the entire electronic book data is displayed on tablet terminal 200 according to Embodiment 1.

With reference to FIG. 8, in the present embodiment, illustrated is a screen 500 displayed on display 206 of tablet terminal 200. In the present embodiment, a case where the electronic book data of "the diary of animals" in relation to the book identification number (ISBN 1111) is transmitted is illustrated as an example.

Screen 500 illustrates such a case that the additional information (external link) is associated with at least a partial region 502 in the body text information is displayed along with the body text information on the basis of the transmitted electronic book data. When the user selects region 502 by using the input device, for example, it is possible to jump to the associated external link.

For example, jumping to the external link makes it possible for the user to browse more detailed information than the information of region 502. In addition to an external link, it is also possible to have the region linked to internal data contained in the electronic book data. For example, audio data containing playable animal sounds and animation data containing playable animal animations may be included as the additional information and it is possible to play the audio data and the animation data. Thereby, it is possible for the user to acquire the additional information which is impossible to obtain from a print book.

Figure 9:
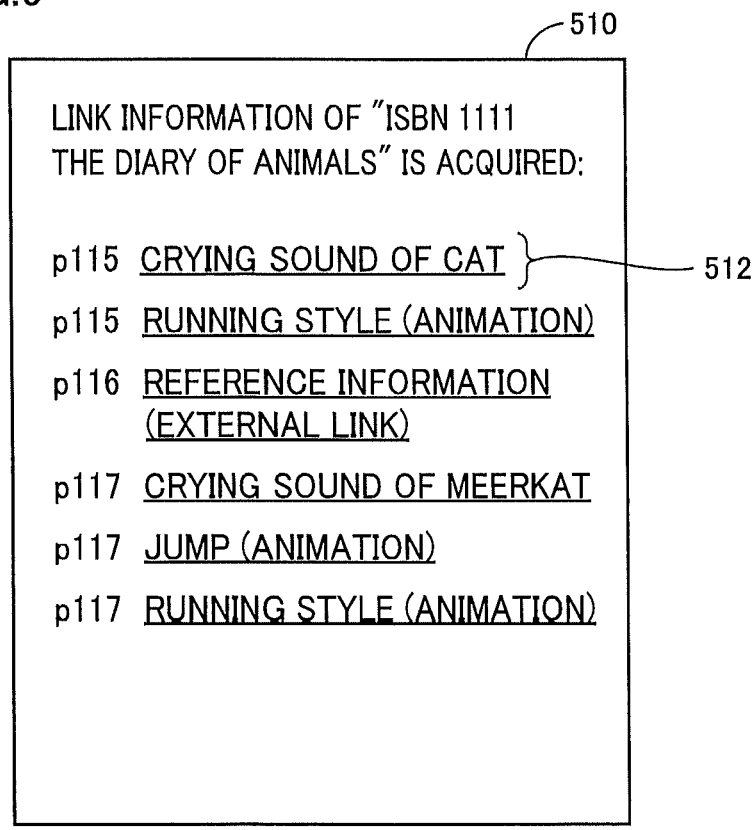
FIG. 9 is a view illustrating a case where only additional information in the electronic book data is displayed on mobile phone 200# according to Embodiment 1 of the present invention.

FIG. 9 is a view illustrating a case where only additional information in the electronic book data is displayed on mobile phone 200# according to Embodiment 1.

With reference to FIG. 9, in the present embodiment, illustrated is a screen 510 displayed on display 206 of mobile phone 200#. In the present embodiment, a case where the electronic book data of "the diary of animals" in relation to the book identification number (ISBN 1111) is transmitted is illustrated as an example.

In Screen 510, only information related to the additional information is displayed on the basis of the transmitted electronic book data.

Specifically, information related to linked locations, for example, "p115 crying sound of cat", "p115 running style (animation)", "p116 reference information (external link)", "p117 crying sound of meerkat", "p117 jump (animation)" and "p117 running style (animation)" are displayed as the information related to the additional information.

For example, when a user selects a region 512 of "p115 crying sound of cat" by using the input device, it is possible for the user to play the audio data related to the crying sound of a cat contained in the additional information of the electronic book data. In case that another region is selected, it is possible to acquire the additional information similarly.

Generally, the display of tablet terminal 200 has a greater area than mobile phone 200#, which makes it highly possible to display the body text information contained in the electronic book data for browsing without any inconvenience in a visible state similar to PC or the like; however, since the display of mobile phone 200# has a small area (display area), it is difficult to display the body text information contained in the electronic book data in a visible state at the same level as tablet terminal 200. Thereby, when the same screen as that displayed on tablet terminal 200 is displayed on the display of mobile phone 200#, the displayable amount of the body text information becomes smaller, which makes the browsing difficult. Accordingly, the user may use the input device of mobile phone 200# to shift the screen or the like, which increases the number of operation times, making it inconvenient to the user.

Accordingly, in the present Embodiment 1, if the terminal has a smaller display area, such as mobile phone 200#, only the additional information contained in the electronic book data is distributed. Thereby, the body text information may be acquired, for example, by reading a purchased book and the additional information which is not contained in the purchased book may be acquired from the electronic book data distributed to mobile phone 200#; consequently, it is possible to solve the problem that it is difficult to read a large amount of information on a mobile phone, and meanwhile since the additional information only can be acquired through selective operations, the user's convenience is improved. Further, when mobile phone 200# has a low display capability and/or a low communication speed, reducing the amount of information can prevent the mobile phone from working slow due to a long communication time for receiving the electronic book data. Furthermore, it is possible to allow only the necessary additional information to be accessed efficiently.

Figure 10:
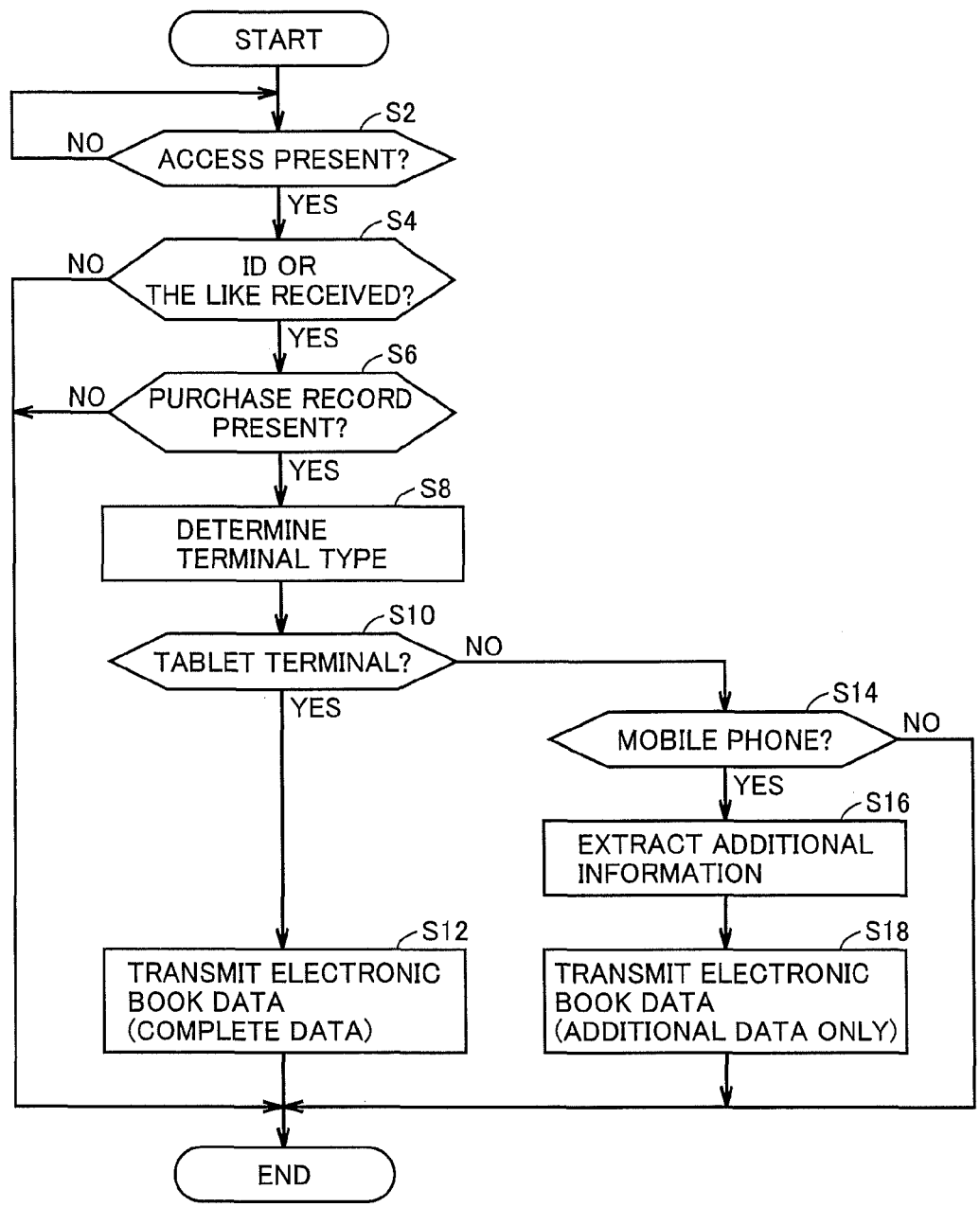
FIG. 10 is a view illustrating a process flow by distribution server 10 according to Embodiment 1 of the present invention.

FIG. 10 is a view illustrating a process flow by distribution server 10 according to Embodiment 1.

With reference to FIG. 10, firstly, CPU 12 determines whether or not an access from the terminal is present (step S2). Specifically, data-acquiring request receiving section 28 determines whether or not a request of acquiring the electronic book data is present. If the access is absent, the process flow remains at the state.

Next, if it is determined that an access from the terminal is present at step S2 (YES at step S2), CPU 12 determines whether or not the user ID or the like is received (step S4). Specifically, data-acquiring request receiving section 28 determines whether or not the information such as the user ID, the book identification number or the like is received in the access. If the user ID or the like is not received, the process is terminated (ended).

Subsequently, if it is determined that the user ID or the like is received at step S4 (YES at step S4), CPU 12 determines whether or not the purchase record is present (step S6). Specifically, whether or not the purchase record in relation to the user ID is present is determined in purchase determining section 30.

Thereafter, if it is determined that the purchase record is present at step S6 (YES at step S6), CPU 12 determines the terminal type (step S8). Specifically, the terminal type is determined in terminal type determining section 32 on the basis of information such as a user agent, IP address or the like contained in the access data. The determination result is output to transmitting section 36.

Next, CPU 12 determines whether or not the accessing terminal is a tablet terminal (step S10). Specifically, transmission switch determining section 37 determines whether or not the accessing terminal is a tablet terminal on the basis of the determination result of the terminal type from terminal type determining section 32.

If it is determined that the accessing terminal is a tablet terminal at step S10 (YES at step S10), CPU 12 transmits the entire data of the "body text+additional" information as the electronic book data in relation to the requested book identification number (step S12). Specifically, when the accessing terminal is a tablet terminal, transmission switch determining section 37 transmits the electronic book data containing the entire data of the "body text+additional" information which is stored in electronic book data storing section 34 to the accessing terminal, i.e. the tablet terminal.

On the other hand, if it is determined that the accessing terminal is not a tablet terminal at step S10 (NO at step S10), whereafter CPU 12 determines whether or not it is a mobile phone (step S14). Specifically, transmission switch determining section 37 determines whether or not the accessing terminal is a mobile phone on the basis of the determination result of the terminal type from terminal type determining section 32.

If it is determined that the accessing terminal is a mobile phone at step S14 (YES at step S14), CPU 12 extracts the additional information (step S16). Specifically, when the accessing terminal is determined to be a mobile phone, transmission switch determining section 37 instructs additional information extracting section 38 to compare electronic book data 300 stored in electronic book data storing section 34 in relation to the requested book identification number and original book data 400 stored in original book data storing section 35 in relation to the same book identification number to extract the additional information on the basis of the comparison result.

Thereafter, CPU 12 transmits the additional information only as the electronic book data (step S18). Specifically, transmission switch determining section 37 transmits the electronic book data containing only the additional information extracted by additional information extracting section 38 to the accessing terminal, i.e. the mobile phone.

On the other hand, if it is determined that the accessing terminal is not a mobile phone at step S14 (NO at step S14), CPU 12 terminates the process (ended). The process is also terminated if the accessing terminal is neither a tablet terminal nor a mobile phone.

According to the process, it is possible to distribute the appropriate electronic book data in accordance with the type of the terminal possessed by the user.

Though it is described in the above that additional information extracting section 38 compares electronic book data 300 stored in electronic book data storing section 34 and original book data 400 stored in original book data storing section 35 to extract the additional information on the basis of the comparison result, it is acceptable to extract additional information different from the above additional information from the data stored in electronic book data storing section 34 through analyzing the body text information. In this case, original book data storing section 35 is not necessary. The same is applicable to any of the following embodiments.

In the present embodiment, it is described that only the additional information in the electronic book data is transmitted when the type of the terminal is a mobile phone; however, the terminal is not limited to a mobile phone, and the same is applicable if the terminal is, for example, a portable terminal having a small display area.

Embodiment 2

The above Embodiment 1 describes the case where only the additional information in the electronic book data is transmitted to the mobile phone; however, it is considered that a user may desire the transmission of the entire electronic book data including the body text information, for example, in a case where the user lost the purchased print book.

In Embodiment 2, the configuration of a distribution server capable of selectively transmitting the entire electronic book data including the body text information to a mobile phone will be described.

Figure 11:
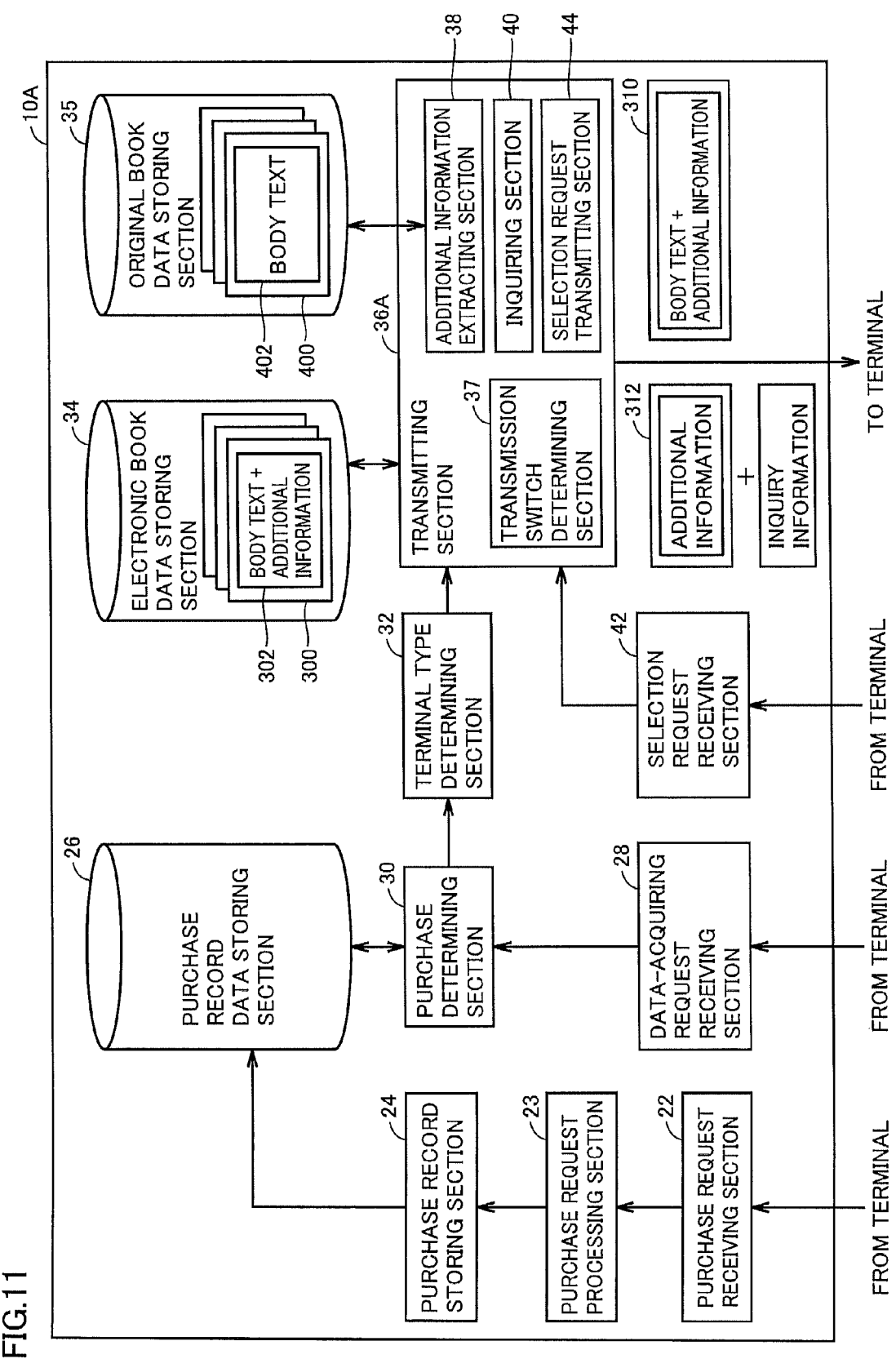
FIG. 11 is a view illustrating functional blocks of a distribution server 10A according to Embodiment 2 of the present invention.

FIG. 11 is a view illustrating functional blocks of distribution server 10A according to Embodiment 2.

With reference to FIG. 11, distribution server 10A differs from distribution server 10 of FIG. 5 in that it includes a selection request receiving section 42 and a transmitting section 36A instead of transmitting section 36. Specifically, in comparison to transmitting section 36, transmitting section 36A further includes an inquiring section 40 and a selection request transmitting section 44.

When the additional information only is transmitted to a mobile phone as the electronic book data, inquiring section 40 transmits a piece of inquiry information appended to the additional information for inquiring the necessity of retransmitting the electronic book data containing the entire data of the "body text+additional" information.

Selection request transmitting section 44 retransmits the electronic book data containing the entire data of the "body text+additional" information in accordance with a selection requiring signal from the accessing terminal.

FIG. 12 is a view illustrating a case where the electronic book data is displayed on mobile phone 200# according to Embodiment 2.

With reference to FIG. 12, in the present embodiment, illustrated is a screen 520 displayed on display 206 of mobile phone 200#, and in comparison to screen 510 of FIG. 9, the difference is that the inquiry information is further appended to the information related to the additional information.

Specifically, a region 522 ("ISBN 1111" [complete data]), which may be used to request the distribution of the entire data, is appended and displayed thereon; thereby, for example, the user may use the input device to select region 522 to request the download of the electronic book data including the entire data of the "body text+additional" information from distribution server 10A.

For example, when region 522 is selected through the input device, a selection request signal is transmitted to distribution server 10A from the mobile phone.

Thus, the selection request signal from the mobile phone is received by selection request receiving section 42 of distribution server 10A and the receipt of the selection request signal is output to transmitting section 36A.

Selection request transmitting section 44 of transmitting section 36A retransmits the electronic book data including the entire data of the "body text+additional" information to the mobile phone in accordance with a selection request instruction from selection request receiving section 42.

Accordingly, even on mobile phone 200#, it is possible to display the electronic book data including the entire data of the "body text+additional" information in accordance with the request from the user. Thereby, it is possible for the user to selectively request the distribution of the entire electronic book data, and the user's convenience is therefore improved.

Embodiment 3

In the above Embodiment 1, the description is made on the configuration capable of distributing the electronic book data in relation to a single book; however, the user's convenience will be improved if it is possible to distribute electronic book data in relation to other purchased books.

In Embodiment 3, the configuration of a distribution server capable of selectively distributing the electronic book data in relation to other purchased books.

Figure 13:
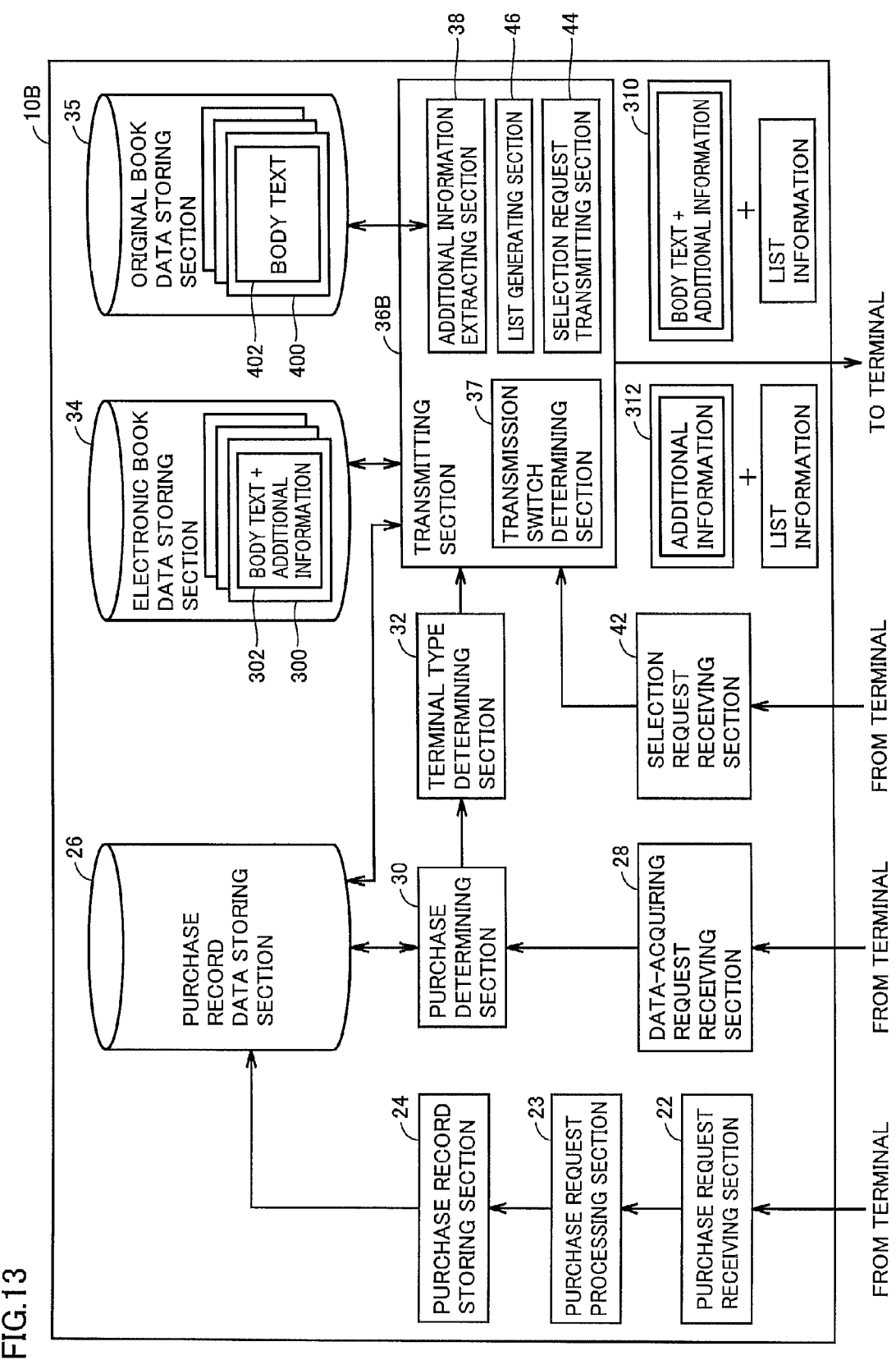
FIG. 13 is a view illustrating functional blocks of a distribution server 10B according to Embodiment 3 of the present invention.

FIG. 13 is a view illustrating functional blocks of distribution server 10B according to Embodiment 3.

With reference to FIG. 13, distribution server 10B differs from distribution server 10 of FIG. 5 in that it includes a selection request receiving section 42 and a transmitting section 36B instead of transmitting section 36. Specifically, in comparison to transmitting section 36, transmitting section 36B further includes a selection request transmitting section 44 and a list generating section 46.

List generating section 46 generates list information of distributable electronic book data according to a verification on the purchase record of a user stored in purchase record data storing section 26, and transmits the generated list information of the electronic book data along with the electronic book data.

Selection request transmitting section 44 retransmits the electronic book data related to the selection request signal according to the selection request signal from the terminal.

FIG. 14 is a view illustrating an approach of generating list information in list generating section 46 according to Embodiment 3.

With reference to FIG. 14(A), illustrated herein is a purchase record of a user stored in purchase record data storing section 26.

List generation section 46 verifies the purchase record, extracts the electronic book data in relation to the purchased books having the identical credit card data or identical user ID and a "Yes" download permission flag, and generates the list information thereof. In the present embodiment, both the credit card data and the user ID are stored in the purchase record; however, it is acceptable that either one is stored therein.

In the present embodiment, as an example, the electronic book data in relation to the book identification numbers (ISBN 9999, ISBN 8888) is extracted. With respect to the extracted electronic book data, the list information containing selections of requesting the distribution of the entire data or the distribution of the additional information only is generated and transmitted along with the electronic book data.

With reference to FIG. 14(B), in purchase record data storing section 26 for the previous purchase records (year 2000), since the distribution service of the electronic book data was not available at that time, the user's purchase record illustrated here has no download permission for the electronic book data. In purchase record data storing section 26 for the present purchase records (year 2012), since the distribution service of the electronic book data has become available, the user's purchase record illustrated here has a purchase record of a book recorded in relation to the book identification number (ISBN 1111) and a "Yes" download permission flag. In the previous purchase records (year 2000) in purchase record data storing section 26, though the purchase records of books in relation to the book identification numbers (ISBN 9999, ISBN 8888) are recorded, the download permission flag is "No" or blank.

In this case, list generation section 46 edits the download permission flag into "Yes" for the purchase records of the electronic book data in relation to the purchase books having the identical credit card data. In the present embodiment, illustrated is a case where the user ID columns are also edited into the identical user ID "me@gmail.com" for the purchase records of the electronic book data in relation to the purchase books having the identical credit card data.

Thereafter, as mentioned above, list generation section 46 extracts the electronic book data in relation to the purchased book having the identical credit card data or identical user ID and a "Yes" download permission flag and generates the list information. The generated list information is transmitted along with the electronic book data.

Figure 15:
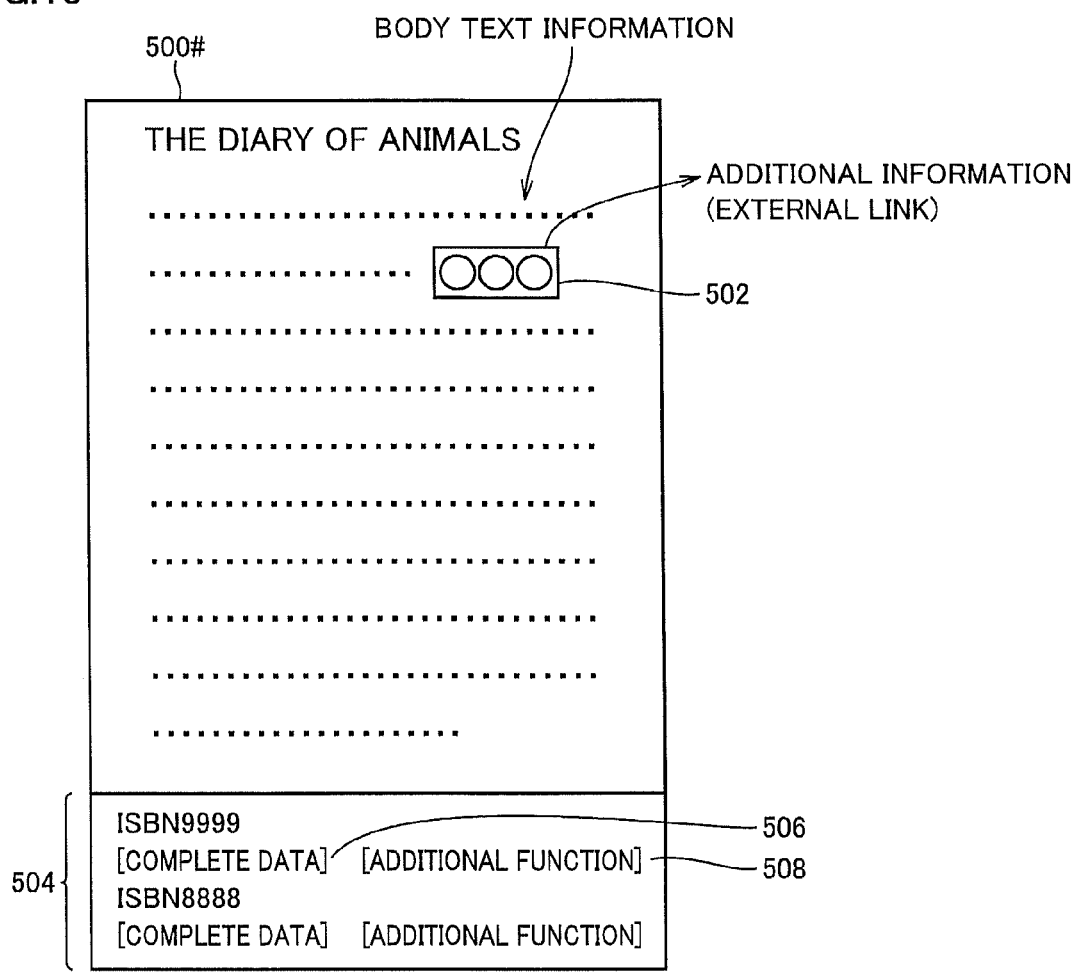
FIG. 15 is a view illustrating a case where the entire electronic book data is displayed on tablet terminal 200 according to Embodiment 3 of the present invention.

FIG. 15 is a view illustrating a case where the entire electronic book data is displayed on tablet terminal 200 according to Embodiment 3.

With reference to FIG. 15, in the present embodiment, illustrated is a screen 500# displayed on display 206 of tablet terminal 200.

Screen 500# differs from screen 500 of FIG. 8 in that list information 504 is appended. The other parts are identical to those in screen 500, and thereby the description thereof will not be repeated.

Specifically, list information 504 is displayed in such a manner that it is possible to selectively request the distribution of the entire data or the distribution of the additional information only with respect to the electronic book data in respective relation to the book identification numbers (ISBN 9999, ISBN 8888).

More specifically, for the book identification number (ISBN 9999), a ([complete data]) region 506 and ([additional function]) region 508 are disposed respectively for requesting the distribution of the entire data or the distribution of the additional information only.

For example, by selecting region 506 (ISBN 9999 [complete data]) through the input device, it is possible for the user to request the download of the entire electronic book data in relation to the requested book identification number from distribution server 10B.

For example, in case that region 506 is selected through the input device, the selection request signal is transmitted to distribution server 10B from tablet terminal 200.

Distribution server 10B receives the selection request signal via selection request receiving section 42 and transmits it to transmitting section 36B.

Selection request transmitting section 44 of transmitting section 36B retransmits the electronic book data containing the entire data of the "body text+additional" information in relation to the requested book identification number to tablet terminal 200 in accordance with a selection request instruction from selection request receiving section 42.

Similarly, in case that region 508 is selected through the input device, the selection request signal is transmitted to distribution server 10B from the tablet terminal.

Distribution server 10B receives the selection request signal via selection request receiving section 42 and transmits it to transmitting section 36B.

Selection request transmitting section 44 of transmitting section 36B retransmits the electronic book data containing only the additional information to tablet terminal 200 in accordance with a selection request instruction from selection request receiving section 42.

Figure 16:
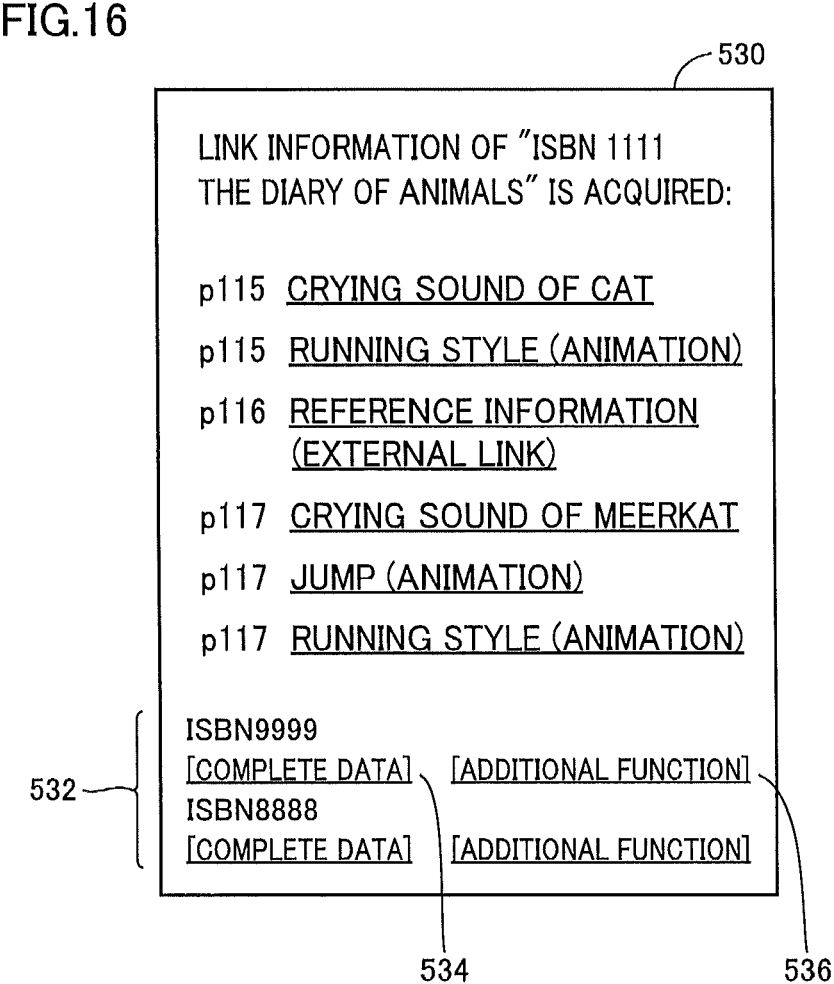
FIG. 16 is a view illustrating a case where only additional information in the electronic book data is displayed on mobile phone 200# according to Embodiment 3 of the present invention.

FIG. 16 is a view illustrating a case where only additional information in the electronic book data is displayed on mobile phone 200# according to Embodiment 3.

With reference to FIG. 16, in the present embodiment, illustrated is a screen 530 displayed on display 206 of mobile phone 200#.

Screen 530 differs from screen 510 of FIG. 9 in that list information 532 is appended. The other parts are identical to those in screen 510, and thereby the description thereof will not be repeated.

Specifically, list information 532 is displayed in such a manner that it is possible to selectively request the distribution of the entire data or the distribution of the additional information only with respect to the electronic book data in respective relation to the book identification numbers (ISBN 9999, ISBN 8888).

More specifically, for the book identification number (ISBN 9999), a ([complete data]) region 534 and a ([additional function]) region 536 are disposed respectively for requesting the distribution of the entire data or the distribution of the additional information only.

For example, by selecting region 534 (ISBN 9999 [complete data]) through the input device, it is possible for the user to request the download of the entire electronic book data from distribution server 10B.

For example, in case that region 534 is selected through the input device, the selection request signal is transmitted to distribution server 10B from mobile phone 200#.

Distribution server 10B receives the selection request signal via selection request receiving section 42 and transmits it to transmitting section 36B.

Selection request transmitting section 44 of transmitting section 36B retransmits the electronic book data containing the entire data of the "body text+additional" information to mobile phone 200# in accordance with a selection request instruction from selection request receiving section 42.

Similarly, in case that region 536 is selected through the input device, the selection request signal is transmitted to distribution server 10B from the tablet terminal.

Distribution server 10B receives the selection request signal via selection request receiving section 42 and transmits it to transmitting section 36B.

Selection request transmitting section 44 of transmitting section 36B retransmits the electronic book data containing only the additional information to mobile phone 200# in accordance with a selection request instruction from selection request receiving section 42.

According to the mentioned configuration, the list information of the electronic book data in relation to the previously purchased book can be displayed on tablet terminal 200 or mobile phone 200#, and it is possible to selectively receive the distribution of the electronic book data containing the "body text+additional" information or the additional information only from the list information; thereby, the user's convenience is improved.

Embodiment 4

In the above Embodiment 1, the description is made on the configuration capable of distributing the electronic book data in relation to a single book; however, the same book may have different version numbers, and the content of the electronic book data may be different according to different version numbers. Thereby, the user's convenience will be improved if the electronic book data can be distributed in relation to the version number of a book possessed by the user.

In Embodiment 4, the description will be made on the configuration of a distribution server capable of distributing the electronic book data in relation to the version number of a book possessed by the user.

Figure 17:
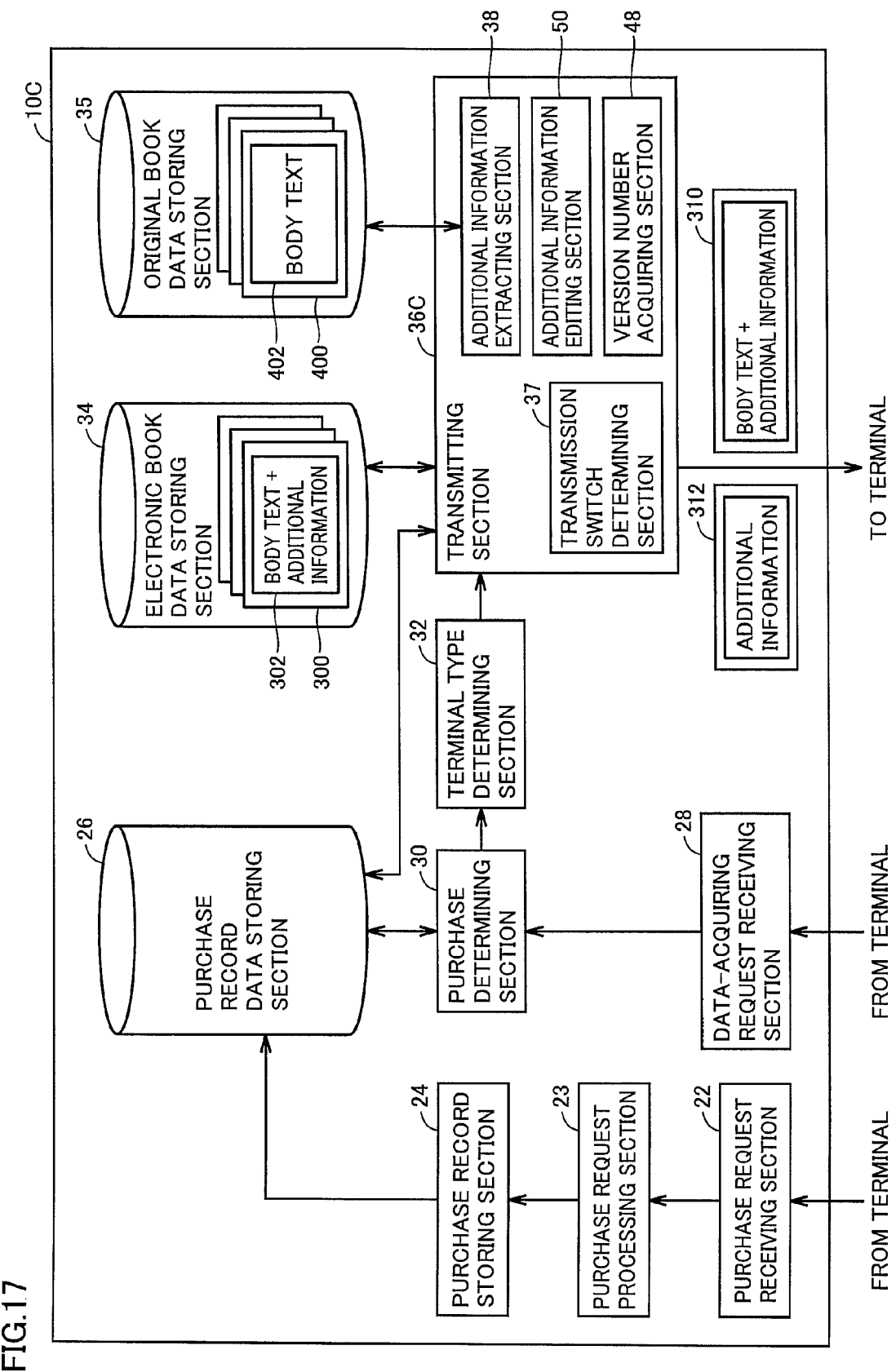
FIG. 17 is a view illustrating functional blocks of a distribution server 10C according to Embodiment 4 of the present invention.

FIG. 17 is a view illustrating functional blocks of distribution server 10C according to Embodiment 4.

With reference to FIG. 17, distribution server 10C differs from distribution server 10 of FIG. 5 in that it includes transmitting section 36C instead of transmitting section 36. Specifically, in comparison to transmitting section 36, transmitting section 36C further includes an additional information editing section 50 and a version number acquiring section 48. In the present embodiment, the electronic book data in relation to the version numbers of a book is stored in electronic book data storing section 34 whenever necessary by the manager or the like. In addition, the original book data in relation to the first version of the book is stored in original book data storing section 35.

Version number acquiring section 48 verifies the purchase record of a user stored in purchase record data storing section 26 to acquire the version number of the book possessed by the user. Specifically, if a book has multiple versions, the version number of the book purchased by the user is specified by comparing the purchase date in the purchase record of the user with the storing date of the electronic book data having different version numbers stored respectively in electronic book data storing section 34.

Additional information extracting section 38 compares the electronic book data having the latest version number stored in electronic book data storing section 34 with the original book data stored in original book data storing section 35, and extracts the additional information on the basis of the comparison result.

Additional information editing section 50 further edits the extracted additional information. Specifically, additional information editing section 50 compares the electronic book data having the latest version number stored in electronic book data storing section 34 with the electronic book data having the version number acquired by version number acquiring section 48 for the book possessed by the user, and appends information related to modifications, amendments and the like on the basis of the comparison result as the additional information.

As mentioned above, transmission switch determining section 37 switches the content of the electronic book data on the basis of the terminal type determined by terminal type determining section 32 and transmits the content to the terminal. For example, if the accessing terminal is determined to be a mobile phone by terminal type determining section 32, only the additional information edited by additional information editing section 50 is transmitted to mobile phone 200# as electronic book data 312.

FIG. 18 is a view illustrating a case where only edited additional information in the electronic book data is displayed on mobile phone 200# according to Embodiment 4.

With reference to FIG. 18, in the present embodiment, illustrated is a screen 540 displayed on display 206 of mobile phone 200#.

Screen 540 differs from screen 510 of FIG. 9 in that a region 542 is appended. The other parts are identical to those in screen 510, and thereby the description thereof will not be repeated.

Specifically, information of "p118 delete lines 6 and 7" is appended and displayed. In the present embodiment, the information indicates that lines 6 and 7 on p118 are deleted when the body text information in relation to the version of a book possessed by the user is compared with the body text information of the book having the latest version.

In other words, the information in relation to a modification portion, an amendment portion and the like, which is edited by additional information editing section 50, is appended as a postscript.

According to the above configuration, the electronic book data containing the additional information in relation to the version of the book possessed by the user can be provided, which improves the user's convenience.

Further, since the information related to the latest version can be extracted by additional information extracting section 38 as the additional information, it is possible for the user to receive the provision of the latest additional information, which is preferable in providing services to the user.

In the present embodiment, the description is made on the case where the deleted information is appended as a postscript; however, it is obviously possible that information or the like being added in a book having the latest version is appended to the additional information as a postscript.

In addition, it is possible to provide a program which causes a computer to execute the controls described in the above flow. Such a program can be recorded in a computer readable recording medium in a computer such as a flexible disk, a CD-ROM (Compact Disk-Read Only Memory), a ROM (Read Only Memory), a RAM (Random Access Memory), a memory card or the like and provided as a program product. Alternatively, it is possible to provide the program by recording it in a recording medium such as a hard disk or the like built in a computer. Moreover, it is possible to provide the program through downloading via a network.

Further, the program may be such one that calls out necessary modules from program modules provided as a part of an operating system (OS) in a computer at predetermined timings according to a predetermined sequence to execute a process. In this case, the program does not include the above modules but cooperates with OS to execute the process. Such a program having no such modules can be included in the program according to the present embodiment.

Furthermore, the program according to the present embodiment may be provided as being embedded in a part of another program. Similarly in this case, the program does not include the modules contained in the another program but cooperates with the other program to execute the process. Such a program embedded in another program can be included in the program according to the present embodiment.

The provided program product is installed in a program storing section such as a hard disk or the like and thereby executed. The program product includes the program itself and a recording medium recorded with the program.

It is possible to combine appropriately the methods described in the above embodiments.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A distribution server for distributing electronic book data via a network comprising:
   an electronic book data storing section configured to store, in relation to a book, at least body text information and additional information associated with at least a part of the body text information;
   a receiving section configured to receive an acquisition request transmitted from a user terminal for the electronic book data in relation to said book;
   a purchase determining section configured to determine, based upon identification information received in the acquisition request, whether or not a user associated with the acquisition request has purchased said book;
   a terminal type determining section configured to determine a type of the user terminal based upon the acquisition request for said electronic book data when the purchase determining section has determined that said user has purchased said book; and
   a transmitting section configured to transmit the electronic book data in relation to said book to the user terminal, said transmitting section including:
      an additional information extracting section configured to extract said additional information contained in said electronic book data on the basis of a determination result of said terminal type determining section; and
      a transmission switch determining section configured to distribute, to the user terminal, the electronic book data containing said body text information and said additional information or the electronic book data containing only said additional information on the basis of the determination result of said terminal type determining section.

2. The distribution server according to claim 1, further comprising a storing section configured to store purchase record data of book purchased by the user, wherein
   said purchase determining section is configured to determine whether or not said user has purchased said book on the basis of said purchase record data.

3. The distribution server according to claim 1, wherein:
   said distribution server is stored with a plurality of electronic book data in respective relation to a plurality of books;
   said plurality of books are respectively assigned with unique identification information; and
   the acquisition request for the electronic book data in relation to said book contains the identification information for identifying said book.

4. The distribution server according to claim 3, wherein the data of said identification information is read from a reading section disposed in the user terminal or input from an input section disposed in the user terminal.

5. The distribution server according to claim 1, wherein the transmitting section further includes an inquiring section configured to transmit, along with the electronic book data including only the additional information associated with said book, an inquiry about whether or not a distribution request for the electronic book data including the body text information and the additional information is present.

6. The distribution server according to claim 1, wherein:
   said distribution server is stored with a plurality of electronic book data in respective relation to a plurality of books;
   said distribution server further includes a storing section configured to store purchase record data of book purchased by the user; and
   said transmitting section further includes a list transmitting section configured to transmit, along with said electronic book data, a list of electronic book data in relation to at least one other book which can be distributed on the basis of the purchase record data stored in said storing section.

7. The distribution server according to claim 6, wherein:
   said list is configured to allow the acquisition request for the electronic book data in relation to an other book to be transmitted selectively from said user terminal;
   said distribution server further includes a list selection receiving section configured to receive the acquisition request for the electronic book data in relation to said other book selected from said list; and
   the transmitting section further includes a retransmitting section configured to distribute the selected electronic book data including said body text information written in said other book and said additional information, based upon the received for the electronic book data in relation to said other book selected from said list.

8. The distribution server according to claim 6, wherein:
   said list is configured to allow the acquisition request (i) for the electronic book data including only said additional information in relation to an other book, or (ii) for the electronic book data including the body text information written in said other book and the additional information, to be transmitted selectively from said user terminal, and
   said distribution server includes:
   a list selection receiving section configured to receive the acquisition request for the electronic book data in relation to said other book selected from said list; and
   a retransmitting section configured to distribute the selected electronic book data including at least one of said body text information written in said other book and said additional information in accordance with a selection of said other book from said list, based upon the received the acquisition request for the electronic book data in relation to said other book selected from said list.

9. The distribution server according to claim 1, wherein said additional information is information other than the body text information written in said book.

10. The distribution server according to claim 9, further comprising an original book storing section configured to store original book data including original text information written in said book, wherein
   said additional information extracting section is configured to compare said electronic book data with the original book data stored in said original book storing section to extract said additional information.

11. The distribution server according to claim 10, wherein:
said electronic book data storing section is configured to store a plurality of electronic book data in respective relation to version numbers of said book, and
said transmitting section includes:
a version number acquiring section configured to acquire information about a version number of said book purchased by said user; and
an editing section configured to compare the electronic book data having the version number acquired by said version number acquiring section with the electronic book data having the latest version number and edit the additional information on the basis of a comparison result.

12. A method for controlling a distribution server for distributing electronic book data via a network the distribution server storing, in relation to a book, body text information written in said book and additional information associated with at least a part of said body text information, comprising:
receiving an acquisition request transmitted from a user terminal for the electronic book data in relation to said book;
determining, based upon identification information received in said acquisition request, whether or not a user associated with the acquisition request has purchased said book;
determining a type of the user terminal based upon the acquisition request for said electronic book data when it is determined that said user has purchased said book; and
distributing the electronic book data in relation to said book to the user terminal,
said distributing the electronic book data to the user terminal including:
extracting said additional information contained in said electronic book data on the basis of a determination result of the type of said terminal; and
distributing, to the user terminal, the electronic book data containing said body text information and said additional information or the electronic book data containing only said additional information on the basis of the determination result of the type of said user terminal.

13. A non-transitory recording medium recorded with a program for controlling a computer of a distribution server for distributing electronic book data, the distribution server storing in relation to a book, body text information written in said book and additional information associated with at least a part of said body text information,
said program being configured to cause said computer to execute a process including:
receiving an acquisition request transmitted from a user terminal for the electronic book data in relation to said book;
determining whether or not said user has purchased said book based upon the acquisition request for the electronic book data in relation to said book;
determining a type of the user terminal based upon the acquisition request for said electronic book data when it is determined that said user has purchased said book; and
distributing, to the user terminal, the electronic book data in relation to said book,
said distributing the electronic book data to the user terminal including:
extracting said additional information contained in said electronic book data on the basis of a determination result of the type of said terminal; and
distributing, to the user terminal, the electronic book data containing said body text information and said additional information or the electronic book data containing only said additional information on the basis of the determination result of the type of said user terminal.

14. The distribution server according to claim 1, wherein the transmission switch determining section is further configured to:
distribute the electronic book data containing the body text information and the additional information, when the user terminal is determined to have a display with a first display size based on a determination result from the terminal type determining section, and
distribute the electronic book data containing only the additional information among the body text information and the additional information, when the user terminal is determined to have a display with a second display size.

15. The non-transitory recording medium recorded with a program according to claim 13 wherein said distributing the electronic book data to the user terminal further includes:
distributing the electronic book data containing the body text information and the additional information, when the user terminal is determined to have a display with a first display size based on a determination result from the terminal type determining section, and
distributing the electronic book data containing only the additional information among the body text information and the additional information, when the user terminal is determined to have a display with a second display size.

* * * * *